(No Model.) 2 Sheets—Sheet 1.
D. GRANT.
MACHINE FOR PEELING POTATOES.
No. 521,495. Patented June 19, 1894.
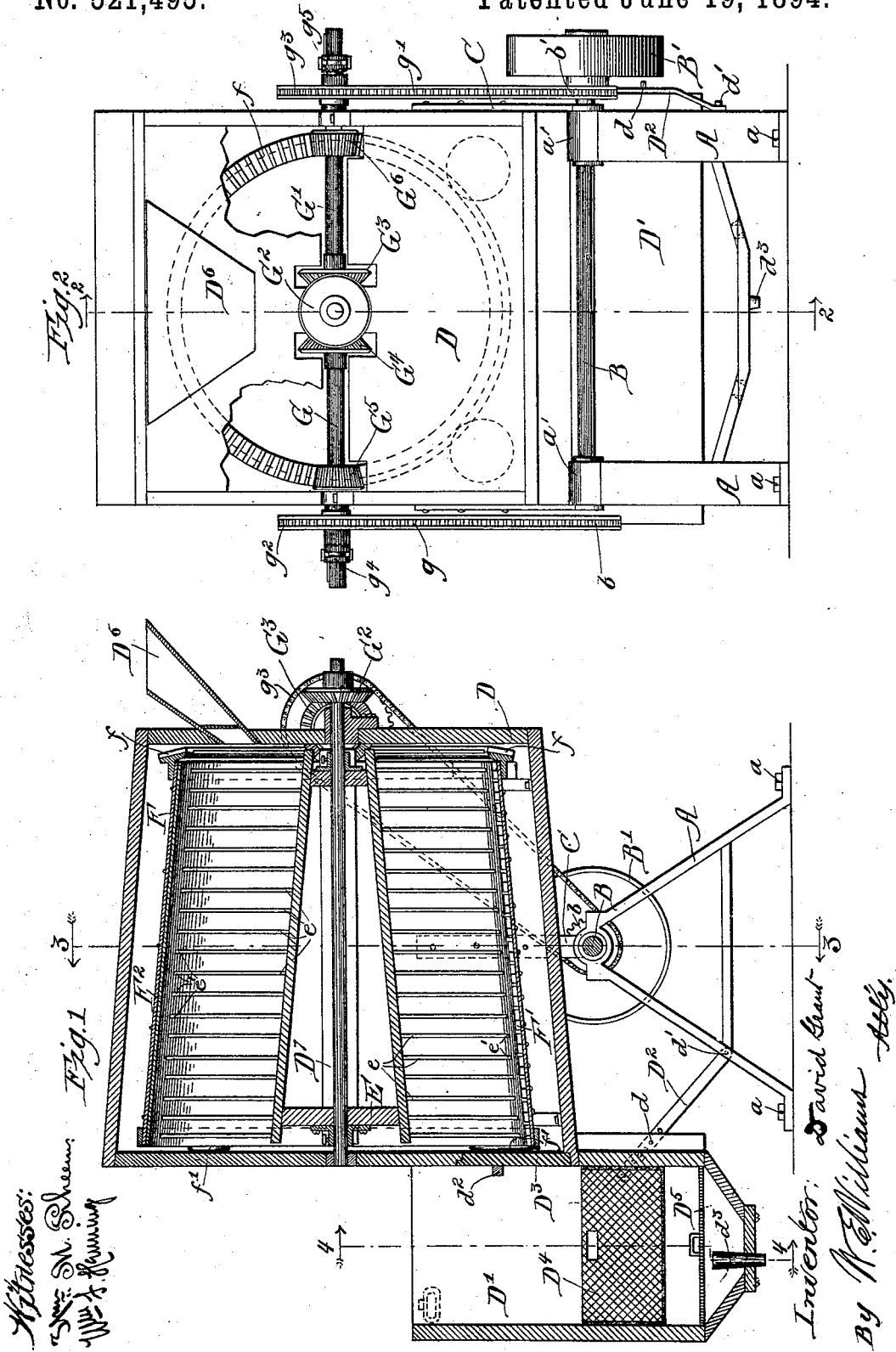

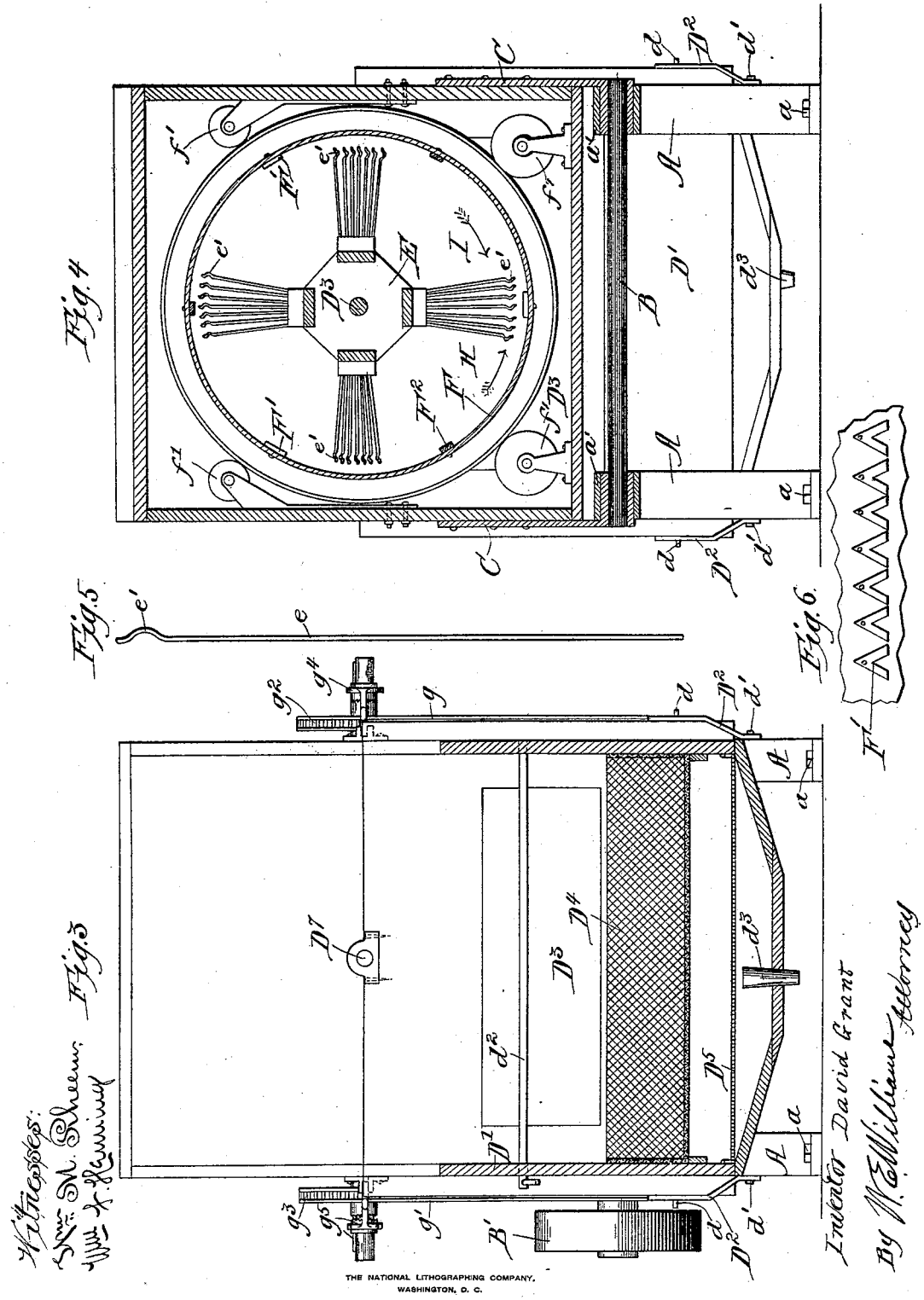

10

UNITED STATES PATENT OFFICE.

DAVID GRANT, OF CHICAGO, ILLINOIS.

MACHINE FOR PEELING POTATOES.

SPECIFICATION forming part of Letters Patent No. 521,495, dated June 19, 1894.

Application filed June 26, 1893. Serial No. 478,901. (No model.)

*To all whom it may concern:*

Be it known that I, DAVID GRANT, a citizen of the United States, residing at Chicago, in the county of Cook and State of Illinois, have invented a new and useful Improvement in Machines for Peeling Potatoes, of which the following is a specification.

The invention relates to machines wherein the potatoes are fed into a hopper, the requisite quantity at a time, and the machine set in motion, and by the abrading action produced by the mechanism of the machine peels the potatoes, and the same are dumped out of the machine, as will be more fully described herein.

The invention consists in the devices set forth in the claims hereof.

Reference will be had to the accompanying drawings, in which—

Figure 1 is a side vertical sectional view, through the center of the machine on line 2. 2. Fig. 2. Fig. 2. is a rear end view of the machine. Fig. 3 is a front view of the machine with the receiving box in section on line 4. 4. Fig. 1. Fig. 4 is a vertical end sectional view on line 3. 3. Fig. 1. Fig. 5 is a side view of one of the brush blades. Fig. 6 is a front view of the grating surface on the inner side of the drum of the machine.

In the drawings "A" designates the frame of the machine, which is bolted to the floor at "$a$," and supports in bearings "$a'$" the driving shaft "B" of the machine. Pivoted in these bearings "$a'$" are two arms "C" "C" bolted to the side of the box or casing of the machine "D," to the front of this casing there is fixed the receiving box "D'" and the whole is held in a fixed position by the locking arm "$D^2$" which has holes "$d$" engaging a pin on the side of the box "D'" and is pivoted to the frame at "$d'$." Through the center of the case "D" and carried in bearings at the ends thereof, there runs a shaft "$D^7$" which carries a rotary steel bladed brush "E." On the interior of the case "D" there is a drum "F" which is carried on rollers "$f'$" "$f'$" "$f'$" "$f'$" fixed to the interior of the case "D." At the rear end of the case "D" are two shafts "G" "G'" carried in bearings on the case "D" these shafts carrying sprockets "$g^2$" "$g^3$" and are driven by chains "$g$" "$g'$" from sprockets "$b$" "$b'$" on shaft "B" which is driven by band "B'." The sprocket wheels "$g^2$" "$g^3$" are provided with ordinary grip clutches "$g^4$" "$g^5$" whereby they may be engaged or disengaged to their respective shafts. The brush "E" is driven by gear wheel "$G^2$" engaging gear wheels "$G^3$" "$G^4$" on shafts "G'" "G" and the drum "F" is provided with gear teeth "$f$" at its end engaging gears "$G^6$" "$G^5$" on shafts "G'," "G."

In the front end of the case "D" there is a gateway "$D^3$" which is water tight and is locked in place by the bar "$d^2$." In the receiving box "D'" below the gate "$D^3$" there is a receiving basket "$D^4$" which is removable, and is made of wire or other material whereby it acts as a strainer. In the same box "D'" below the receiving basket there is a removable screen "$D^5$" and below this screen "$D^5$" there is a space for waste water which may be drawn off by removing the plug "$d^3$." The bottom of the case "D" is made to incline toward the box "D'" and the drum "F" is made conical and the rotary brush "E" is made to conform to the drum "F." The rotary brush "E" is made of four or more divisions of steel blades "$e$" which are shaped at their outer ends as shown at "$e'$." On the interior of the drum "F" there are three sets of gratings "F'" and three straight bars "$F^2$." To the case "D" there is a hopper "$D^6$" whereat the machine is fed.

The operation of the machine is as follows: Water is supplied filling the case up about midway, then a sufficient quantity of potatoes is supplied and the machine set in motion from the band wheel "B'" only the clutch "$g^4$" engaging its sprocket. The shaft "G" revolves and drives the brush "E" in one direction and the drum "F" in the other direction thus rolling the potatoes over and over in contact with the blades "$e$" and the gratings "F'" and bars "$F^2$" and thus all sides of the potatoes are brought in contact with the ends of the brushes "$e$" and thus the outer coating is abraded away, and the potatoes travel along down the incline to the gate "$D^3$" and when the action has been sufficient the operator opens gate "$D^3$" and disengages the locking bar "$D^2$" and tilts the case forward and dumps the potatoes into the basket D⁴. The water drains off to the bottom of D′ and the peelings are caught on screen D⁵ and the potatoes are removed in basket "D⁴." When the skins of the potatoes are hard and tough the brush is made to revolve, by shifting the clutches $g^4$, $g^5$, in the direction of the arrow "H" Fig. 4, and when the skins are tender the brush is made to revolve in the direction of the arrow I.

What I claim is—

1. In a machine for peeling potatoes, a frame "A" a case "D" pivoted to said frame, a receiving box "D′" fixed to said case, a revoluble drum "F" and rotary brush E within said case, driving mechanism consisting of a horizontal shaft "B" driving shafts "G G′" by suitable mechanism, clutches for engaging and disengaging said mechanism with shafts "G G′," gears "G⁵" and "G⁶" engaging teeth on said drum and gears "G³" and "G⁴" engaging gear "G²" on shaft "D⁷" of brush substantially as shown and described.

2. In a machine for peeling potatoes a revoluble drum "F" and a rotary brush "E" revolving within said drum said brush having flexible steel blades curved at their extremities as shown at "$e'$," in combination with mechanism for reversing the direction of travel of the brush in order to change the application of the curved ends of the blades on the stock to be peeled to suit the nature of said stock.

3. In a machine for peeling potatoes a revoluble drum "F" having a series of straight bars "F²" and a series of V-shaped projections "F′" on its interior in combination with a rotary brush "E" substantially as shown.

4. In a machine for peeling potatoes a frame "A" carrying a horizontal driving shaft "B," a case "D" pivoted to frame "A" concentric with the shaft "B," a rotary drum "F" revoluble within said case, a rotary brush "E" revoluble within said drum, mechanism for driving said drum and brush from the shaft "B" whereby the same may operate in any desired position of the case "D" with relation to frame "A," mechanism for holding said case "D" in different positions with relation to said frame "A" whereby the angle of incline of travel of stock through the drum may be varied to suit the varying condition of stock.

In witness whereof I have hereunto subscribed my name in the presence of two witnesses.

DAVID GRANT.

Witnesses:
JOHN GRANT,
D. O. JAMES.